US009262076B2

(12) United States Patent
Townsend et al.

(10) Patent No.: US 9,262,076 B2
(45) Date of Patent: Feb. 16, 2016

(54) SOFT KEYBOARD INTERFACE

(75) Inventors: Reed L. Townsend, Kirkland, WA (US);
Mudit Agrawal, Redmond, WA (US);
Andrey Borissov Batchvarov,
Redmond, WA (US); Fei Su, Issaquah,
WA (US)

(73) Assignee: Microsoft Technology Licensing, LLC,
Redmond, WA (US)

(*) Notice: Subject to any disclaimer, the term of this patent is extended or adjusted under 35 U.S.C. 154(b) by 31 days.

(21) Appl. No.: 13/230,723

(22) Filed: Sep. 12, 2011

(65) Prior Publication Data

US 2013/0067382 A1    Mar. 14, 2013

(51) Int. Cl.
| G06F 3/048 | (2013.01) |
| G06F 3/0489 | (2013.01) |
| G06F 3/0488 | (2013.01) |
| G06F 3/0481 | (2013.01) |

(52) U.S. Cl.
CPC ........ G06F 3/04895 (2013.01); G06F 3/04886 (2013.01); *G06F 3/0481* (2013.01)

(58) Field of Classification Search
CPC . G06F 3/04886; G06F 3/0488; G06F 3/0487;
G06F 3/04883; G06F 3/0481–3/0484
USPC ........... 715/773, 822, 810, 812; 345/173, 168
See application file for complete search history.

(56) References Cited

U.S. PATENT DOCUMENTS

| 5,748,512 A * | 5/1998 | Vargas ........................... 708/142 |
| 5,801,941 A * | 9/1998 | Bertram ........................... 700/83 |
| 5,963,671 A * | 10/1999 | Comerford et al. ........... 382/230 |
| 6,259,436 B1 * | 7/2001 | Moon et al. .................... 345/173 |
| 6,573,844 B1 * | 6/2003 | Venolia et al. .................. 341/22 |
| 6,654,733 B1 | 11/2003 | Goodman et al. |
| 7,372,454 B2 * | 5/2008 | Betts-LaCroix .............. 345/168 |

(Continued)

FOREIGN PATENT DOCUMENTS

| CN | 101526879 A | 9/2009 |
| JP | 2009245031 A | 10/2009 |

(Continued)

OTHER PUBLICATIONS https://en.wikipedia.org/wiki/Component-based_software_engineering; extracted Jun. 15, 2015.*

(Continued)

*Primary Examiner* — Steven B Theriault
(74) *Attorney, Agent, or Firm* — Tim Churna; Judy Yee; Micky Minhas

(57) ABSTRACT

User experience of the performance of a computing device is improved through an operating system that processes inputs from a soft keyboard to provide information that can be used to accurately determine keys a user intended to strike while typing. For each detected tap, the operating system provides a probability that one or more keys were the intended target for the user. These probabilities may be computed from probability distribution functions that are dynamically determined based on user and/or system factors, such as typing rate and keyboard style or layout. Other components may use the probabilities to select a key corresponding to a detected keyboard tap as representing the intended user input. The selection may be made based on the probabilities alone or in combination with contextual factors that yield an overall probability that a detected tap arose from a user targeting a specific key.

19 Claims, 10 Drawing Sheets

(56) References Cited

U.S. PATENT DOCUMENTS

| | | | |
|---|---|---|---|
| 8,065,624 B2* | 11/2011 | Morin et al. | 715/773 |
| 8,589,149 B2* | 11/2013 | Cecil et al. | 704/9 |
| 8,782,556 B2* | 7/2014 | Badger et al. | 715/816 |
| 8,786,551 B2* | 7/2014 | Perry | 345/168 |
| 8,812,972 B2* | 8/2014 | Bangalore | 715/773 |
| 2004/0183833 A1* | 9/2004 | Chua | 345/773 |
| 2006/0028450 A1* | 2/2006 | Suraqui | 345/169 |
| 2007/0216658 A1* | 9/2007 | Rainisto | 345/173 |
| 2007/0273561 A1* | 11/2007 | Philipp | 341/33 |
| 2008/0301575 A1* | 12/2008 | Fermon | 715/773 |
| 2009/0158144 A1* | 6/2009 | Griffin | 715/261 |
| 2009/0174667 A1* | 7/2009 | Kocienda et al. | 345/169 |
| 2009/0195506 A1 | 8/2009 | Geidl et al. | |
| 2010/0036655 A1* | 2/2010 | Cecil et al. | 704/10 |
| 2010/0141590 A1 | 6/2010 | Markiewicz et al. | |
| 2010/0228539 A1* | 9/2010 | Slocum et al. | 704/9 |
| 2010/0315266 A1* | 12/2010 | Gunawardana et al. | 341/22 |
| 2011/0050576 A1* | 3/2011 | Forutanpour et al. | 345/168 |
| 2011/0074704 A1* | 3/2011 | Causey et al. | 345/173 |
| 2011/0084922 A1 | 4/2011 | Rider et al. | |
| 2011/0086674 A1 | 4/2011 | Rider et al. | |
| 2011/0202876 A1 | 8/2011 | Badger et al. | |
| 2011/0210850 A1 | 9/2011 | Tran | |
| 2011/0264442 A1* | 10/2011 | Huang et al. | 704/9 |
| 2012/0044149 A1* | 2/2012 | Son et al. | 345/169 |
| 2012/0203544 A1* | 8/2012 | Kushler | 704/9 |
| 2012/0304100 A1* | 11/2012 | Kocienda et al. | 715/773 |

FOREIGN PATENT DOCUMENTS

| | | |
|---|---|---|
| JP | 2009252076 A | 10/2009 |
| JP | 2011511370 A | 4/2011 |
| WO | 2011044663 A1 | 4/2011 |
| WO | 2011044664 A1 | 4/2011 |

OTHER PUBLICATIONS

George T. Heineman, "Component-Based Software Engineering: Putting the Pieces Together" 2001.*

"International Search Report", Mailed Date: Sep. 19, 2012, Application No. PCT/US2011/055816, Filed Date: Oct. 11, 2011, pp. 9.

Davison, R., "Optimization of a Touch Screen Soft Keyboard for Speed and Accuracy," Senior Research Proposal for B. Sci., Stetson University, Deland, Florida, Spring 2011, downloaded Jun. 21, 2011, http://www2.stetson.edu/mathcs/people/students/research/pdf/2010/rdavison/final.pdf, pp. 1-22.

Go et al., "Arranging Touch Screen Software Keyboard Split-keys based on Contact Surface," *Proc. CHI 2010: Work in Progress,* Apr. 14-15, 2010, Atlanta, Georgia, pp. 3805-3810, downloaded Jun. 21, 2011, http://dmrussell.net/CHI2010/docs/p3805.pdf.

Gunawardana et al., "Usability Guided Key-Target Resizing for Soft Keyboards," *Proc. 15th International Conf. on Intelligent User Interfaces,* Feb. 7-10, 2010, Hong Kong, China, pp. 111-118, downloaded Jun. 21, 2011, http://research.microsoft.com/pubs/118375/paper-final.pdf.

Hoggan et al., "Investigating the Effectiveness of Tactile Feedback for Mobile Touchscreens," *CHI '08 Proc. 26th Annual SIGCHI Conference on Human Factors in Computing Systems,* Apr. 5-10, 2008, Florence, Italy, 10 pages, downloaded Jun. 21, 2011, http://citeseerx.ist.psu.edu/viewdoc/download?doi=10.1.1.139.6452&rep=rep1&type=pdf.

Mackenzie et al., "Eye Typing Using Word and Letter Prediction and a Fixation Algorithm," *ETRA '08 Proc. of the 2008 Symposium on Eye Tracking Research & Applications,* Mar. 26-28, 2008, pp. 55-58, downloaded Jun. 21, 2011, http://www.yorku.ca/mack/etra2008-p55-mackenzie.pdf.

"First Office Action and Search Report Issued in Chinese Patent Application No. 201210335826.4", Mailed Date: Oct. 30, 2014, 15 Pages.

"Supplementary Search Report Issued in European Patent Application No. 11872346.9", Mailed Date: Jun. 8, 2015, 7 Pages.

"Second Office Action Issued in Chinese Patent Application No. 201210335826.4", Mailed Date: Jun. 5, 2015, 8 Pages.

"'Office Action Issued in Japanese Patent Application No. 2014-529691", Mailed Date: Oct. 20, 2015, 3 Pages. (W/O English Translataion).

"Office Action Issued in Chinese Application No. 201210335826.4 Mailed Date: Nov. 25, 2015", 6 Pages.

* cited by examiner

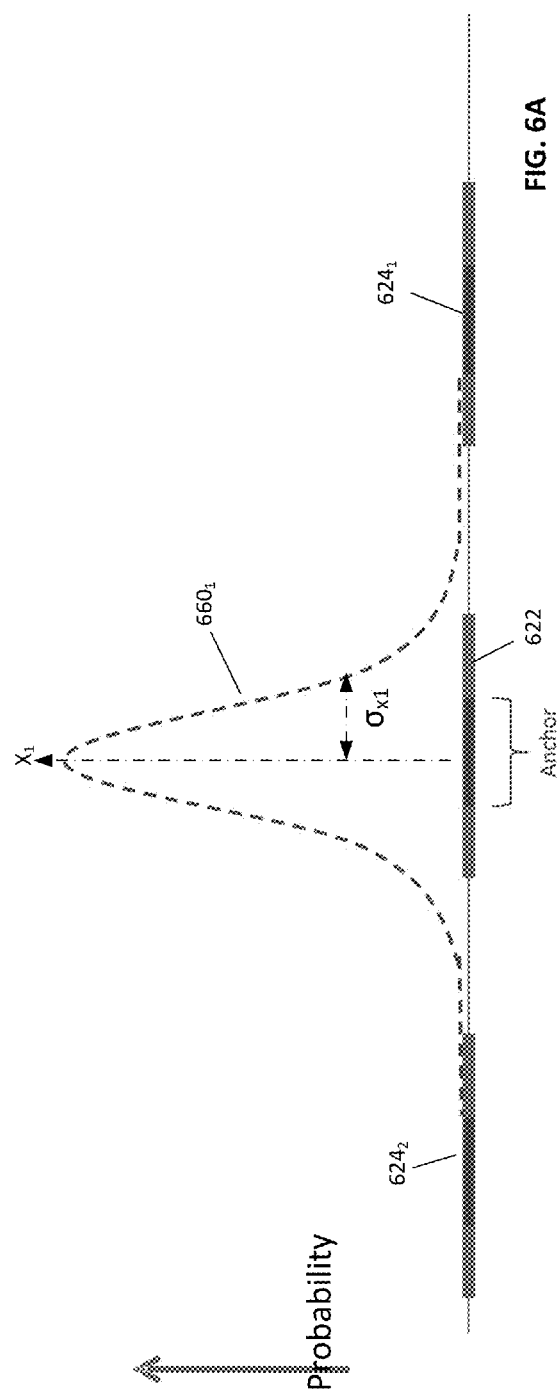
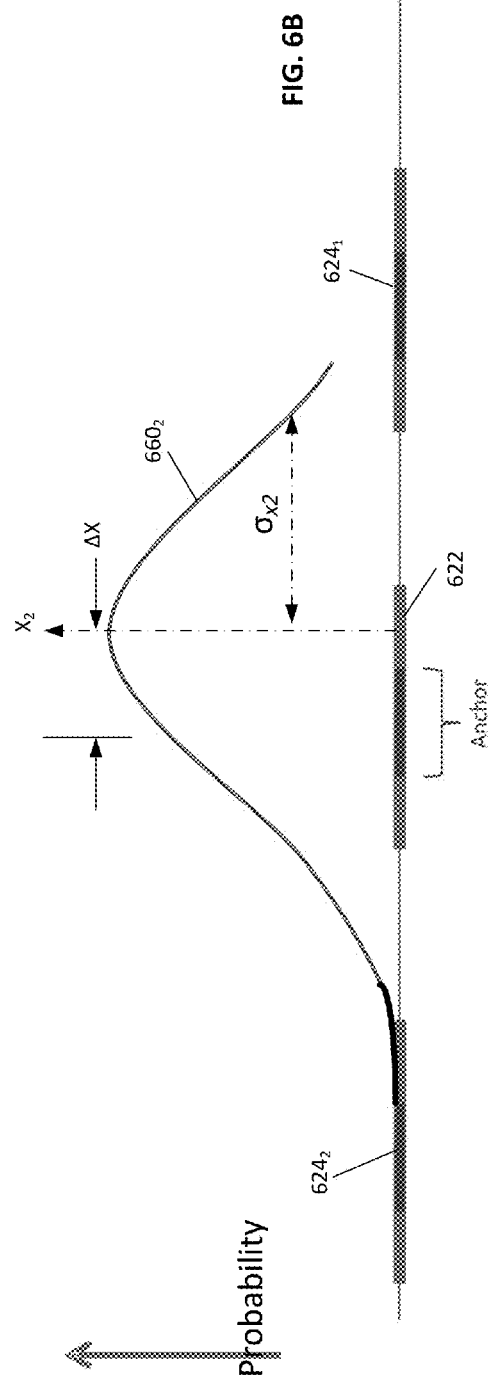

SOFT KEYBOARD INTERFACE

BACKGROUND

Computing devices use various forms of human interface devices. Most computers include some form of display to present information visually to a user. In addition, most computers have one or more user input devices. Keyboards and mice are widely used input devices for desktop computers.

For computers that are more mobile, the functions of the output and input devices can be combined into a touch sensitive display. Such a display can render output as in a traditional computer. In addition, portions of the screen can be associated with control functions. When a user touches a designated portion of the screen, the computer interprets the touch as user input activating that control.

Many computers with touch sensitive displays, particularly those without separate keyboards for receiving user input, can be controlled to display a keyboard. When the user presses on the display screen where a key of the keyboard is pictured, the computer interprets that detected input in the same way that it would interpret a signal from a traditional keyboard when a key is pressed. A keyboard created in this fashion on a touch sensitive display is sometimes called a "soft keyboard."

SUMMARY

A computing device determines a probability that a detected activation of a keyboard indicates that a user targeted a key on the keyboard. In some embodiments, for a detected activation of the touchscreen in the vicinity of the keyboard, multiple probabilities, each associated with a key, may be determined and reported for subsequent processing as keyboard input. The probabilities may be computed based on probability distribution functions associated with keys of the soft keyboard.

The probability distribution functions may be determined based on any of a number of factors. The factors may relate to the design of the computing device or parameters of the soft keyboard as rendered. Alternatively or additionally, factors related to a user of the computing device may be used in determining the probability distribution functions. An exemplary factor that may be used is typing speed, which may be represented by an average rate at which taps, representing keystrokes, are detected.

In one aspect, the invention relates to a method of operating a computing device having a soft keyboard. The method includes determining at least one characteristic of at least one of: (i) a user's interaction with the soft keyboard or (ii) a layout of the soft keyboard. For each of a plurality of keys on the soft keyboard, a probability distribution function is determined based on the at least one determined characteristic. With at least one processing circuit, in response to an input received through the soft keyboard, and based on the probability distribution functions, a probability that the user targeted a key of the plurality of keys is generated.

In another aspect, the invention relates to at least one computer-readable storage medium comprising computer-executable instructions that, when executed, perform a method of operating a component within a computing device that processes input from a soft keyboard. The component receives an indication of activation by a user at a location of a soft keyboard and provides an output. The output includes, for each of a plurality of keys on the soft keyboard, a probability that the detected activation represents a user targeting the key.

In yet a further aspect, the invention relates to a computing device with a display adapted to provide an indication of a user tap at a location on the display. The computing device also includes processing circuitry adapted to render a soft keyboard in a region on the display and monitor a typing rate of user interaction with the soft keyboard. For a detected user tap in the region, the processing circuitry provides, for at least one key adjacent the location, a probability that a user targeted the key. That probability may be based on the typing rate of the user.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 6A and 6B are conceptual sketches illustrating variation in a probability distribution function based on dynamically determined factors;

DETAILED DESCRIPTION

Figure 1:
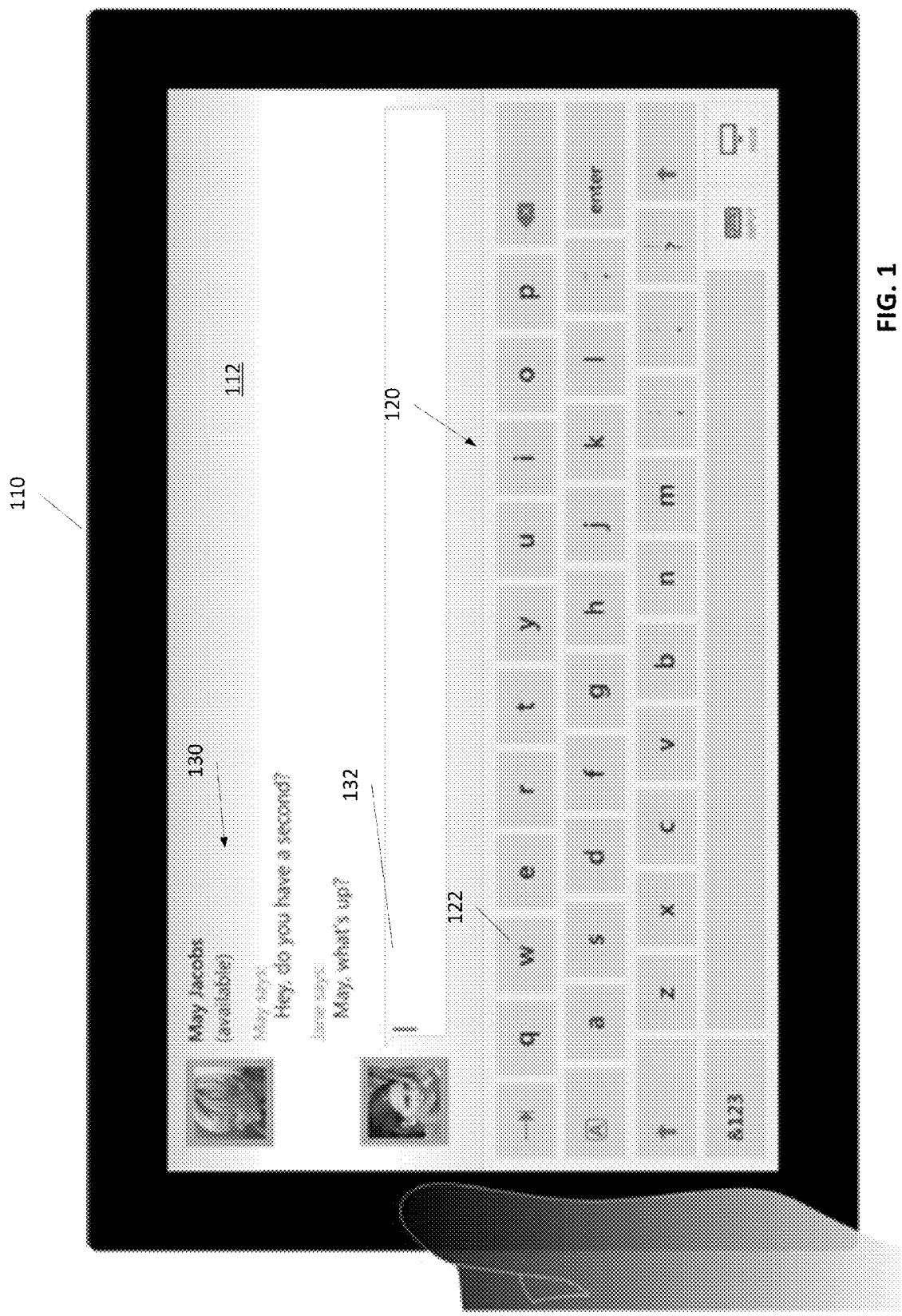
FIG. 1 is a sketch of a touchscreen computing device with a soft keyboard of a first style rendered on the touchscreen.

The inventors have recognized and appreciated that poor performance of a soft keyboard may contribute to a user's perception of poor performance of a computing device. Soft keyboards, lacking tactile feedback that can occur from mechanical motion of keys in a traditional keyboard, exhibit increased risk of a mismatch between a user's intended target of a keyboard tap and a key that a computer system selects as the target of a detected tap on the keyboard. Such a mismatch can lead to apparently erroneous responses to user input and can be a source of user frustration.

To better align the computer response to activation of a keyboard and an intended user input, a component within the computing device processing keyboard inputs may, for detected activations of the keyboard, indicate a probability that one or more keys were the target of the activation. These probabilities may be used by other components of the computing device that respond to user inputs to select, in context, a most likely key targeted by the user. The selection, for example, may be made in combination with a probability that a particular key stroke completes a word or other string of characters. Though, the probability information may be used in any suitable way.

The probability that an activation, such as a detected "tap" on the keyboard, corresponds to a keystroke may be based on dynamic factors. These factors may relate to the user and/or may relate to the computing device. Examples of factors relating to the computing device may include a layout of the keyboard, including style of keyboard, size of keys and spacing between keys, or the position, orientation or motion of the computing device.

Factors relating to the user may be determined based on user interaction with the computer. For example, the user's typing speed may be sensed and used in determining a probability that a user targeted a particular key with a tap on the keyboard.

Typing speed may be factored into determination of the probability in any suitable way. As an average typing speed increases, for example, the probability distribution function of all keys may have a greater variance. Though, typing speeds may impact the probability distribution functions associated with different keys differently. For example, the impact may depend on the location of the key on the keyboard, with the variance associated with keys closer the center of the keyboard increasing less than for those further from the center.

Similarly, the mean of the probability distribution function for each key may change as values of dynamically determined factors, such as typing speed, change in use. The change in the mean of each probability distribution function may likewise depend on location of the key on the keyboard.

Moreover, there may be an interrelationship between factors. For example, probability distribution functions associated with the same key may change differently for keyboards with different styles or different key sizes and spacing. Accordingly, in some embodiments, a keyboard interface component within the operating system of a computing device determines, on an on-going basis may update, probability distribution functions for keys on the keyboard based on factors relating to the keyboard as rendered on the touchscreen and/or dynamically sensed factors.

In some embodiments, probability distribution functions for the keys may be generated by supplying values of parameters for a model of a probability distribution function. As a specific example, each probability distribution may be modeled as a Gaussian distribution. The probability distribution function of a key may be determined from values of parameters that define an offset and a variance of the Gaussian distribution model. As keyboard input is processed, the keyboard interface component may select values of model parameters characterizing the probability distribution functions based on dynamically determined information. Though, it should be appreciated that any suitable technique may be used to model the probability distribution of the keys, and it is not a requirement that a Gaussian distribution be used or that the same model be used for all keys. Regardless of how the probability distribution function for each key is modeled, typing speed and/or other factors may be used to select values of the appropriate parameters for the model for each key at any given time. In some embodiments, the values for the parameters for a key may depend on the location of the key on the keyboard. For example, the variance may be greater for keys at the periphery of the keyboard. As another example, the variance may increase as a function of typing speed a greater amount for keys at the periphery than near the center.

Alternatively or additionally, a mean of the probability distribution function may vary as a function of typing speed and key location. For a traditional QWERTY keyboard, the mean of a probability distribution function for a key may be offset towards the center of the keyboard. Though, the amount of that offset may depend on typing speed.

In addition, factors relating to the computing device may also impact the distribution functions. These factors may relate to the parameters of the soft keyboard itself. For example, factors such as the size of the keys or gutters between keys as rendered on a display of the computing device may impact both the mean and offset of a probability distribution function. Alternatively or additionally, the keyboard style may impact the probability distribution functions. As a specific example, probability distribution functions associated with keys of a split keyboard may be different or vary differently as function of typing speed than probability distribution functions associated with keyboards of other styles. These differences may be reflected in different values of parameters used to compute a probability distribution function from a model or in any other suitable way.

Other factors alternatively or additionally may be considered in defining probability distribution functions from a model. For example, limits may be applied in conjunction with computing the probability distribution function from a model. As a specific example, keys may have regions, referred to herein as "anchors," associated with them. The anchor may correspond generally to the center of the key such that, if an input in the anchor region is detected, a high probability that the user intended to target the key is assigned. In some embodiments, a component processing keyboard input may assign a probability of 1 to a user input detected in the anchor region.

Alternatively or additionally, limits on the probability distribution function for a key may be such that a probability of zero is assigned to user inputs detected that are too far from a center of key. Such limits may be imposed in any of a number of suitable ways. For example, a component processing keyboard input may return a non-zero probability only for a sub-set of the keys on the keyboard. The sub-set may be selected such that a probability is provided only for keys underlying or adjacent the area (contact geometry) of detected input or underlying/adjacent to the key being hit.

Regardless of how the probability distribution functions are defined, they may be used to process keyboard inputs. Keyboard inputs may be processed in any suitable way in any suitable component within a computer system. In some embodiments, processing as described herein may be performed within a kernel-mode component of an operating system of the computer system. However, the specific implementation is not a requirement of the invention. For example, processing as described herein may alternatively or additionally be implemented in a semiconductor chip acting as a controller for a touch sensitive display.

FIG. 1 provides an example of a computing device in which some or all of these techniques described herein may be used to provide an improved user experience. FIG. 1 is a sketch of a computing device 110 having a touchscreen 112 as a user interface. Computing device 110 is here shown to have a slate form factor. In the slate form factor, the touchscreen 112 occupies substantially all of an upper surface of computing device 110. However, the specific form factor of the computing device is not a limitation on the invention.

Computing device 110 may be constructed using hardware components as are known in the art. Those components may include the touchscreen 112 as well as a touchscreen controller (not shown). Those components may interact to detect user interaction with touchscreen 112. Those components may operate, using techniques as are known in the art, to detect a user gesture intended as input through touchscreen 112. Those components, for example, may detect pressure from a user's finger on the surface of touchscreen 112. Alternatively, the components may detect capacitance or other measurable effects associated with a user's finger, like contact geometry, or other pointing device adjacent touchscreen 112. Though any suitable technology may be used to detect a gesture by a user representative of an input through the touchscreen.

Regardless of the mechanism used to detect user gestures indicating input through the touchscreen, the touchscreen component may output information indicating that such input has been detected. The output of the touchscreen controller may be interpreted by other components, possibly software components, executing a computing device 110. For example, an operating system (not shown) of computing device 110 may include a touchscreen interface component. The touchscreen interface component may interpret detected inputs based on the position of the inputs relative to information displayed on touchscreen 112.

In the example of FIG. 1, computing device 110 is actively executing an application that supports chat type communications. That application is supplying content which is rendered in display area 130. User interactions with touchscreen 112 in display area 130 may be interpreted as commands to that application. For example, display area 130 includes a field 132, representing a field in which text may be entered. A user touch in field 132 may be interpreted by the application as a command signifying that subsequently received inputs are to be interpreted as the text for a message to be sent.

In the state illustrated in FIG. 1, touchscreen 112 also includes a portion on which a soft keyboard 120 is rendered. The soft keyboard could, in some embodiments, be rendered by the application supplying content for display area 130. However, in the embodiment illustrated, touchscreen 112 is rendered by a touchscreen interface component within the operating system of computing device 110. The touchscreen interface controller may determine when and where to display soft keyboard 120 based on commands from the application controlling display area 130. Though, the specific triggers that cause the display of soft keyboard 120 are not critical to the invention. Regardless of when and where the soft keyboard 120 is displayed on touchscreen 112, detected inputs in the region of touchscreen 112 in which soft keyboard 120 is displayed may be interpreted as keyboard input and passed to the soft keyboard interface component for processing.

In the example of FIG. 1 processing of input in the region occupied by soft keyboard 120 may entail processing to determine which of the keys of the soft keyboard 120 were the intended target of the user input. For example, soft keyboard 120 includes multiple keys, of which key 122 is numbered. An output of the soft keyboard interface component may indicate to the chat application providing content in area 130 that key 122, or any other key, was likely a target of user input.

In some embodiments, an indication of user interaction with touchscreen 112 may be pre-processed before processing within the soft keyboard interface component or may be post-processed prior to providing an indication to the chat-type application that specific user input was received. The pre-processing may be performed using techniques as are known in the art. For example, motion across the surface of touchscreen 112 characteristic of unintended contact with touchscreen 112, rather than an intended selection of a key on soft keyboard 120, may be filtered out. As another example of pre-processing, in some touchscreen interfaces, there may be a difference between a location at which the touchscreen controller detects contact with the touchscreen and the location where the user perceived the contact to have been provided. In some embodiments, these differences may be corrected through calibration of the touchscreen such that compensation using factors determined during calibration may be applied to touch inputs prior to processing by the soft keyboard interface component.

Such pre-processing may improve operation of a soft keyboard control component by ensuring that touch inputs received at that component better represent an indication that a user intended to activate a key. As used herein, input determined to be indicative of user intent to activate a key on the soft keyboard may be regarded as a "tap" on the soft keyboard. Accordingly, a soft keyboard control component may receive and respond to "taps" on the keyboard.

"Taps" may be defined and identified in any suitable way. In some embodiments, a "tap" may be identified by a short duration contact with touchscreen 112 in a region occupied by soft keyboard 120. However, it is not a requirement that a "tap" be characterized only by such short-term contact with the soft keyboard 120. As an example of possible alternatives, a computing device may support a mode of interaction in which a user slides a finger or other pointing device across a surface of the touchscreen 112. Changes in direction or velocity of motion across the surface of touchscreen 112 or other characteristics of that motion may be equated with a user intent to activate a key on soft keyboard 120. Accordingly, it should be appreciated that the invention is not limited by the mechanism used to identify a "tap" on soft keyboard 120.

In addition to pre-processing of inputs received through a touchscreen, post-processing of outputs of a soft keyboard control component may also be performed. Post-processing of a determination that a user intended to target a key on a soft keyboard may be performed using techniques as are known in the art. However, in contrast to a conventional soft keyboard interface component that designates a user input by indicating that a specific key of soft keyboard 120 was tapped, a soft keyboard interface component as described herein may output probabilities associated with one or more keys of the soft keyboard 120. Each of the probabilities may indicate a probability that a user targeted the associated key. These probabilities may be used, for example, to better match actions of the computing device with the user's intent to target a key on the keyboard.

Though techniques as described herein may be employed with post-processing of any suitable type, in some embodiments, the probabilities associated with one or more keys may be provided to a text prediction engine. The text prediction engine may track the reported keys and their associated probabilities and determine a most likely user input based on context. As a specific example, a text prediction engine may process a string of taps to select a most likely word intended by the user. The text prediction engine may base the prediction on the probabilities reported by the soft keyboard interface component as well as context information. The context information may be used to compute an overall probability that a key sequence corresponds to an intended user input.

For example, in a context in which soft keyboard 120 is providing text inputs to an application component in which context indicates that English words are expected, a sequence of taps in which the first tap associates equal probability with keys "q," "w," "a," and "s" may be received. This tap may be followed by a tap in which there is a high probability associated with the key "u" and lower probabilities associated with keys "i," "j," and "k." Through post-processing, this sequence of inputs may be mapped to a key sequence "qu." Because there is a high probability of English words including the sequence "q u," that sequence has a highest overall probability of any sequence that could be formed from the possible keys corresponding to each of the taps in the sequence when both the probability of occurrence of that sequence in English words is considered along with the targeting probability. However, it should be appreciated that the specific post-processing of probabilities associated with each of the taps is not critical to the invention, and the information may be used in any suitable way.

Figure 2:
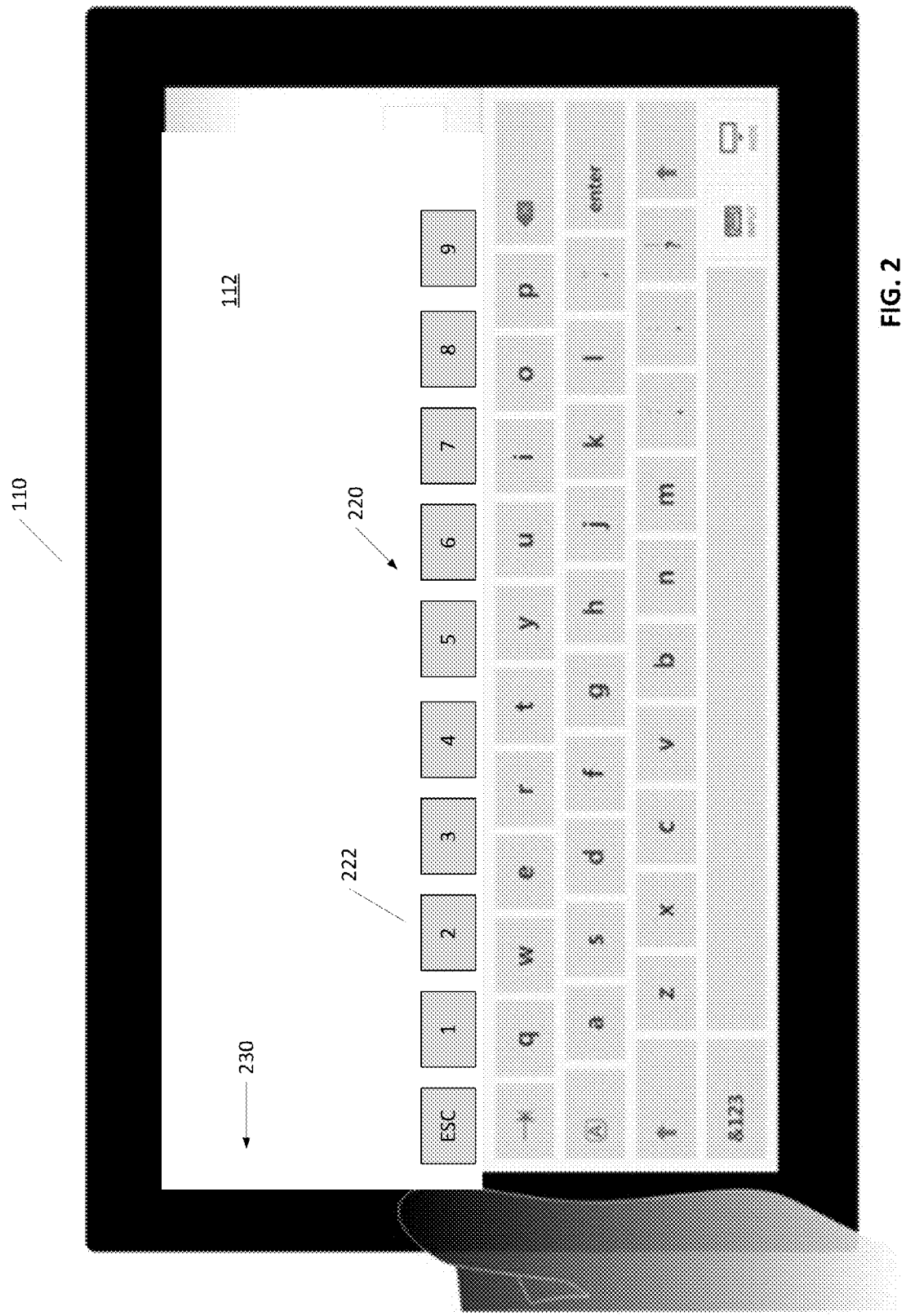
FIG. 2 is a sketch of the computing device of FIG. 1 with a soft keyboard of an alternative style rendered on the touchscreen.

Turning to FIG. 2, computing device 110 is shown in an alternative operating state. In the state illustrated in FIG. 2, a soft keyboard 220 is rendered on touchscreen 112. Soft keyboard 220 is similar to soft keyboard 120 (FIG. 1). In each case, a region of touchscreen 112 is used to display keys of the soft keyboard. Though, in FIG. 2, soft keyboard 220 contains more keys than keyboard 120.

The style of keyboard 220 may be appropriate for use with applications intended to receive more complex or more formal input. As a specific example, soft keyboard 220 includes keys, of which key 222 is numbered, representing numbers. Soft keyboard 220, for example, may mimic a traditional physical keyboard. In contrast, soft keyboard 120 may correspond to a keyboard with a simplified style. Keyboard 120 may be appropriate for use with an application facilitating chat-type communications or other informal correspondence. In contrast, keyboard 220 (FIG. 2) has a style more appropriate for use with a word processor, spreadsheet, or other application used in business. Region 230, for example, may represent an interface area for a word processing application. Accordingly, the style of the keyboard that appears on a computing device may be set based on a request from an application receiving as input the detected taps on the soft keyboard as input. Though, other factors, including user preference or detected orientation of the computing device, may be used to determine a style of a soft keyboard rendered on a computing device such that the style may change dynamically.

Regardless of how the keyboard style is determined, the outputs produced by a soft keyboard interface component within computing device 110 may be prepared in a conceptually similar fashion. However, the style may impact the accuracy with which a user strikes a targeted key. Accordingly, information about the keyboard style may be used in computing a probability that a detected tap reveals a user intent to target a specific key.

Figure 3:
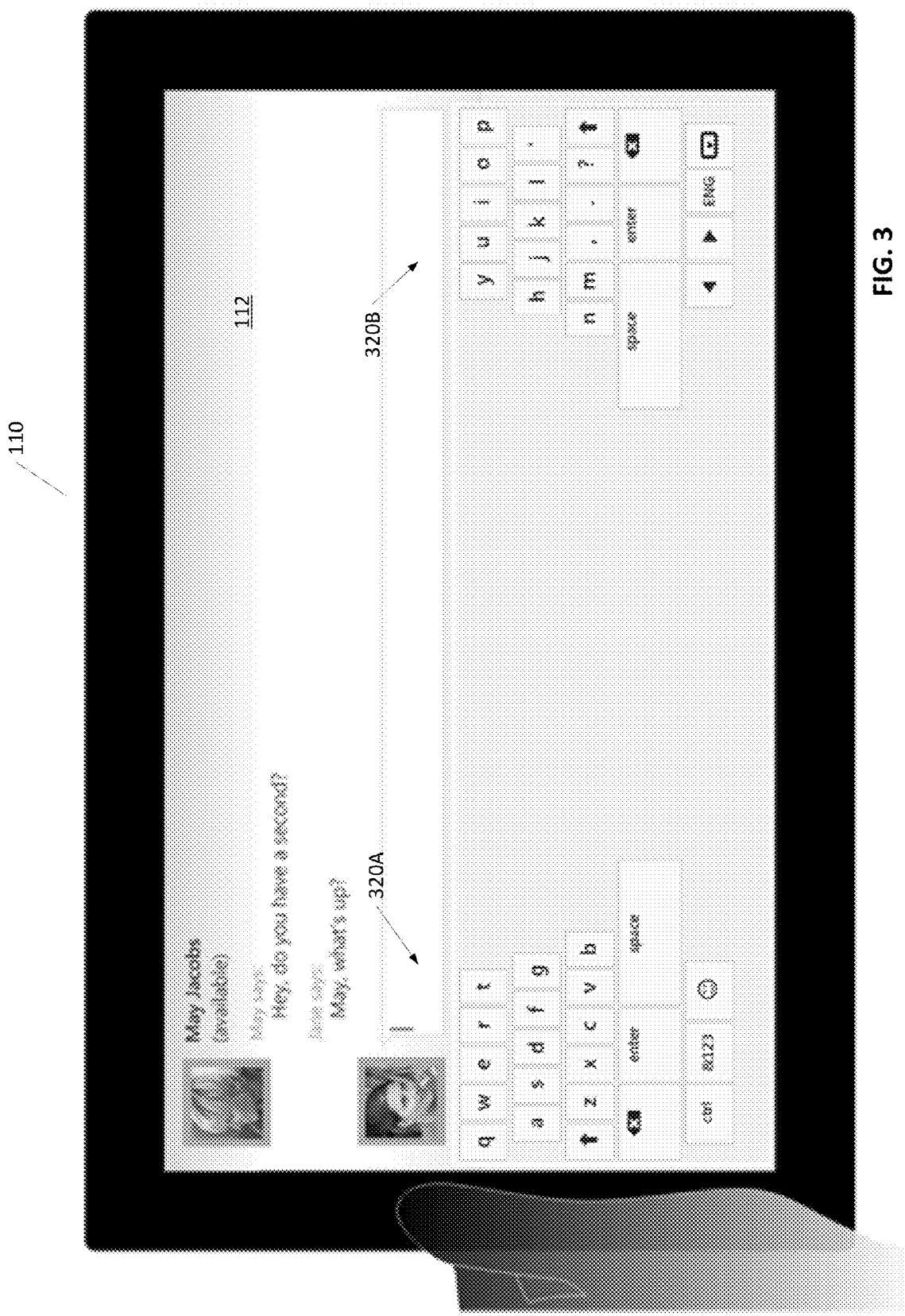
FIG. 3 is a sketch of the computing device of FIG. 1 with a soft keyboard of a further alternative style rendered on the touchscreen.

FIG. 3 illustrates yet a further keyboard style that computing device 110 may support. In the example of FIG. 3, the keyboard has a split style. As can be seen, a soft keyboard is rendered on touchscreen 112 in keyboard portions 320A and 320B. In contrast to FIGS. 1 and 2 in which soft keyboards 120 and 220 are laid out with keys in a generally continuous array, the keys of the soft keyboard in the example of FIG. 3 are clustered along the sides of the touchscreen 112. This configuration allows users of computing device 110 to touch touchscreen 112 over keyboard portions 320A and 320B using only their thumbs. Such a typing style may be useful, for example, for a user holding computing device 110 in their hands. In contrast, the styles of soft keyboards 120 and 220 may be more appropriate for a user placing computing device 110 on a table and interacting with the soft keyboard as if it were a physical keyboard. The styles illustrated in FIGS. 1 and 2 also may be preferred by a user typing with one finger. Despite differences in style, soft keyboard portions 320A and 320B may operate conceptually the same as keyboards 120 and 220 in that the soft keyboard interface component may process taps associated with the regions occupied by soft keyboard portions 320A and 320B to determine, for each tap, probabilities for one or more keys that the user intended to target the key.

Though touch inputs associated with each style of keyboard may be processed in the same way, the style and other characteristics of the keyboard may impact the specific probabilities assigned to a detected input representing a tap on a soft keyboard. Though information about a keyboard style may be used in any suitable way to determine probabilities, in some embodiments, keyboard style is one factor used in selecting values of parameters of a model used to define probability distribution functions. An exemplary approach to defining probability distribution functions in this way is illustrated in FIGS. 4A, 4B, 5A, 5B, 6A and 6B.

Figure 4A:
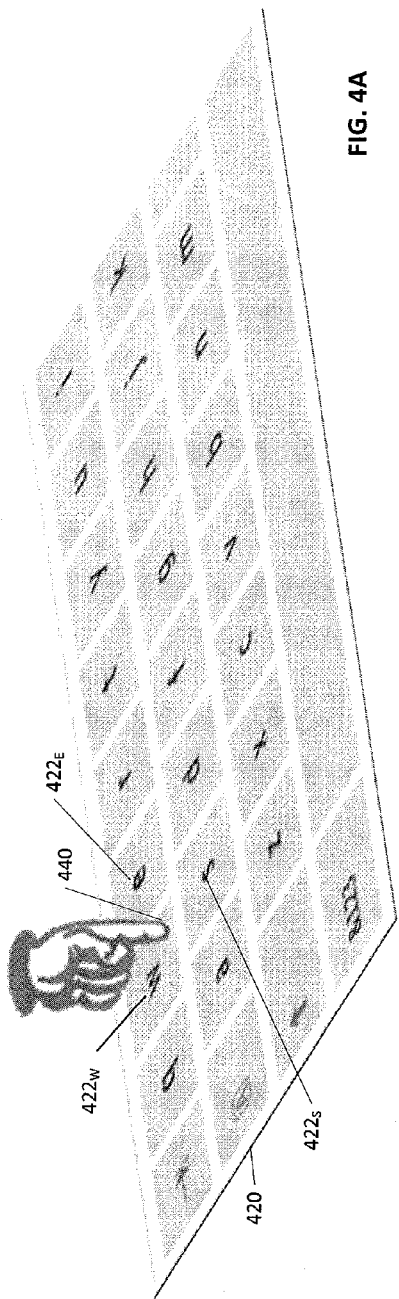
FIGS. 4A and 4B are conceptual sketches illustrating user input indicating an intent to target a key on a soft keyboard.
Figure 4B:
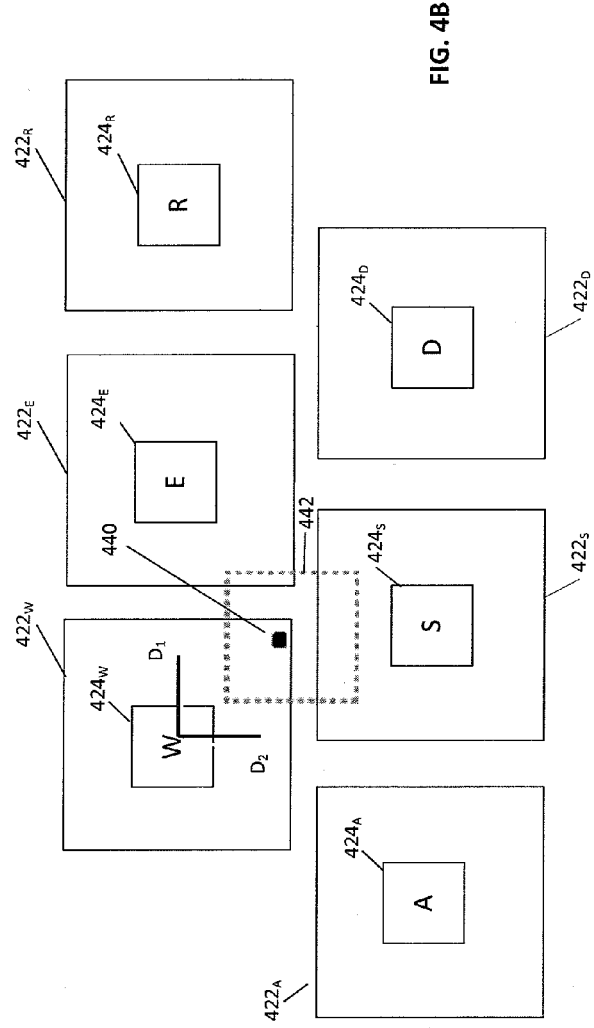

FIG. 4A illustrates a soft keyboard 420. In this example, a user may press on the keyboard 420 at a location 440. In this example, the location 440 overlies key $422_W$, corresponding to a key for the letter "W." Though, as can be seen in FIG. 4B, location 440 is not in a center region of key $422_W$. To the contrary, location 440, though within the boundary of key $422_W$, is adjacent key $422_E$ and $422_S$. Location 440 is also close to other keys, such as keys $422_A$ and $422_D$. Though further away, on a small keyboard, location 440 may be close to more remote keys, such as key $422_R$. Thus, there is ambiguity as to which of the keys on soft keyboard 420 was targeted by a tap detected at location 440. The ambiguity of which key was targeted is further expanded when the size of the user's finger used to provide the input in location 440 is considered. Region 442 represents a rectangle bounding the locations at which pressure was detected in connection with the touch input. Thus, rather than occurring at a single point, location 440 represents a centroid or other average of the region 442 over which touch was detected. In this example, region 442 overlaps three keys, keys $422_W$, $422_E$, and $422_S$.

A tap in location 440 could, as in a conventional keyboard, be reported as a user selection of key $422_W$, because that key is closest to location 440. However, a detected input in location 440 could indicate a user intent to target an adjacent key, such as $422_E$ or $422_S$. However, by associating a tap in location 440 with a single key, key $422_W$ in this example, information indicating a possibility that the user targeted another key, such as key $422_E$ or $422_S$, is not available for selecting a most likely text input in context. Accordingly, a soft keyboard interface component may compute, for each input representing a tap on a soft keyboard, values representing a probability for one or more keys that the detected input reveals a user's intent to target the key. These probabilities may then be provided to other components for post processing.

A probability that a user intended to target a key with a detected tap may be computed in any suitable way. In some embodiments, the probability may be computed based on a spatial probability distribution function associated with each of multiple keys. Each spatial probability distribution function may be expressed relative to the center of its corresponding key. Based on the position of a detected tap relative to the center of a key, the spatial probability distribution function for the key may indicate the probability that the tap indicates a user intent to target that key.

For example, location 440 is offset from the center of key 422$_W$ by a distance $D_1$ in a first direction, and a distance $D_2$ in a second orthogonal direction. The value of a two-dimensional probability distribution function associated with key 422$_W$ at coordinates corresponding to $D_1$ and $D_2$ may indicate a probability that an input at location 440 reveals a user intent to target key 422$_W$.

Location 440 is offset, though by different amounts, from the centers of other keys, such as 422$_E$, 422$_S$, 422$_A$, 422$_D$, and 422$_R$. The offsets between the centers of those keys and location 440 may similarly be used to determine from probability distribution functions associated with those keys a probability that an input at location 440 reveals a user intent to target each of those keys.

In theory, there may be a non-zero probability that a tap detected at any location of a touchscreen reveals a user intent to target any key on a soft keyboard. However, in some embodiments, processing may be simplified by imposing limits on the spatial extent of the probability distribution functions associated with each of the keys. For example, in some embodiments, a central portion of a key, called an "anchor" herein, may be associated with a probability indicating a high probability that a user targeted the key. For example, anchors 424$_W$, 424$_E$, 424$_R$, 424$_A$, 424$_S$, and 424$_D$ appear in the central portions of the keys illustrated in FIG. 4B.

A high probability may be indicated in any suitable way. In some embodiments, a high probability may be indicated by associating a probability of 1 with a key when a tap is detected within the anchor for that key. Alternatively or additionally, a high probability may be indicated by suppressing, or setting to zero, probability information for other keys when a detected tap occurs within the anchor region of another key.

Accordingly, the anchor regions may provide a further limit on the probability distribution functions associated with the keys. In some embodiments, the probability distributions associated with each of the keys may be limited to indicate a zero value when the detected input is located within an anchor for another key. Alternatively or additionally, the probability distribution functions may be limited to have low or zero values for any location that is displaced in any direction from the center of the key by an amount that is greater than the distance, in that direction, to the nearest anchor of another key. Though, any suitable mechanism may be used to represent a low probability that a user targeted certain keys. For example, the limit may be expressed by simply providing no probability information for that key.

Figure 5A:
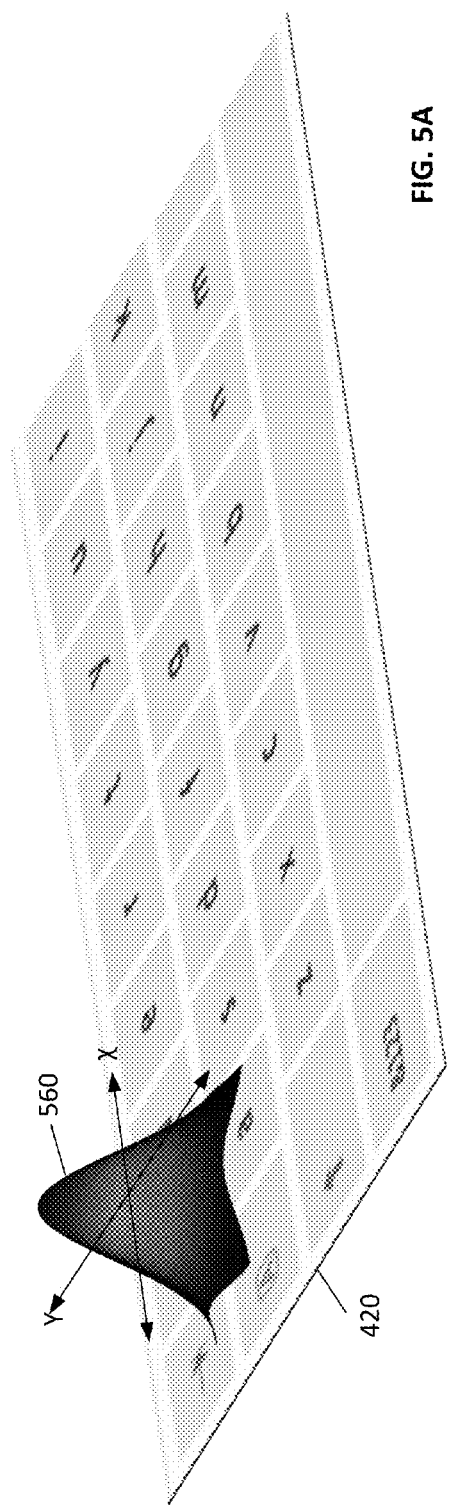
FIGS. 5A and 5B are conceptual sketches illustrating probability distribution functions of input locations relative to target keys on a soft keyboard.

FIG. 5A illustrates conceptually a two-dimensional spatial probability distribution function for key 422$_W$ superimposed on soft keyboard 420. Here, probability distribution function 560 has a peak in the vicinity of the center of key 422$_W$. The value of the probability distribution function decreases with increasing distance from the center of the key.

In this example, probability distribution function 560 extends in two directions, labeled "x" and "y" in FIG. 5A. In the specific example illustrated, keyboard 420 has keys laid out in rows, which are parallel to the direction indicated "x." The orthogonal direction is indicated "y." As illustrated in FIG. 4B, a probability that a user intended to target key 422$_W$ may be determined from the displacement of the location of the touch input and the center of key 422$_W$.

Figure 5B:
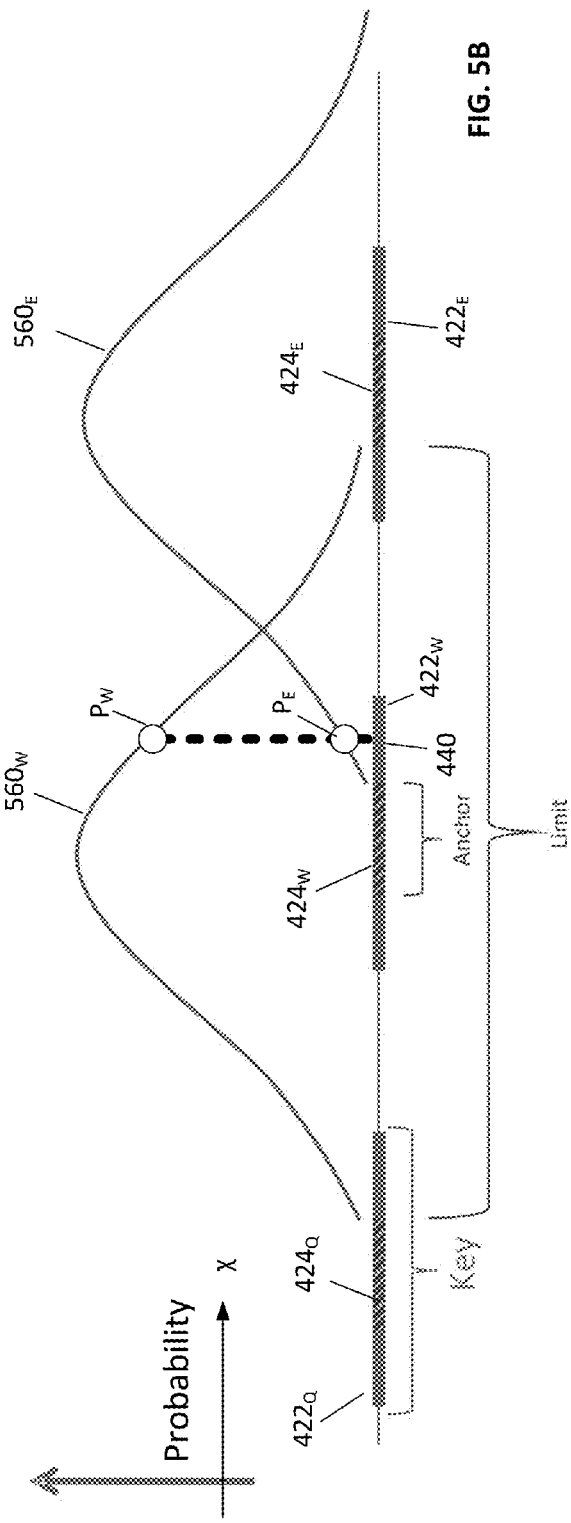

In the example of FIG. 5A, probability distribution function 560 extends in two dimensions, corresponding to the two-dimensional layout of keyboard 420. Though, for simplicity of illustration, FIG. 5B illustrates the manner in which a probability may be determined based on the probability distribution function using a simplified one-dimensional representation. FIG. 5B shows a subset of the keys on keyboard 420 in cross-section. Here, keys 422$_Q$, 422$_W$, and 422$_E$, are illustrated. Probability distribution functions 560$_W$ and 560$_E$ are shown. As can be seen in FIG. 5B, at a location 440, probability distribution function 560$_E$ has a value $P_E$. The value $P_E$ corresponds to the probability that a tap detected at location 440 indicates a user intent to strike key 422$_E$. Similarly, probability distribution function 560$_W$ has a value $P_W$ at location 440. The value $P_W$ indicates the probability that a detected tap at location 440 indicates a user intent to strike key 422$_W$.

FIG. 5B also illustrates application of limits to the probability distribution functions based on distance to adjacent anchors. As can be seen, probability distribution function 560$_W$ has a non-zero probability extending from the center of key 422$_W$ towards key 422$_E$ until the anchor 424$_E$ is reached. Thereafter, probability distribution function 560$_W$ has a zero value. It should be noted, however, that the probability of a key need not converge to zero at the boundary of its limits. In some embodiments, the Gaussians may be chopped off their values outside their limit areas. Similarly, probability distribution function 560$_W$ has a non-zero value extending from the center of key 522$_W$ towards key 422$_Q$. However, probability distribution function 560$_W$ has a zero value upon encountering anchor 424$_Q$. Probability distribution function 560$_E$ is similarly limited, having a non-zero value until anchor 424$_W$.

The probability distribution function associated with each key may be determined in any suitable way. In the embodiment illustrated in FIG. 5B, values of the parameters of a probability distribution model are first determined. The distribution function generated from that model is then limited based on the position of the anchors. Though, it is not a requirement that the probability distribution function be expressed using a model and limits in this way. For example, a distribution may be defined using a model that has zero values without imposing limits.

FIGS. 6A and 6B illustrate techniques for determining the probability distribution functions using models and limits. FIG. 6A illustrates a probability distribution function 660$_1$ modeled as a Gaussian distribution. A Gaussian distribution may be represented by a limited number of parameters. In this example, the Gaussian distribution is characterized by a mean, indicated a $X_1$, and a value representative of spread, which may be a variance, and is here indicated by $\sigma_{x1}$. In this case, probability distribution function 660$_1$ is further limited by a distance to adjacent anchor regions, illustrated in FIG. 6A as anchor regions 624$_1$ and 624$_2$.

Probability distribution function 660$_1$ indicates a probability that a tap indicates a user intent to target key 622. FIG. 6A shows probability distribution function 660$_1$ in a single dimension for simplicity. Though, as described above in connection with FIGS. 5A and 5B, a probability distribution function associated with keys on a two-dimensional keyboard may extend in two dimensions.

In this example, the mean $X_1$ of probability distribution function 660$_1$ is close to the center of key 622. The spread $\sigma_{x1}$ generally corresponds to the width of key 622, such that probability distribution function 660$_1$ assigns a relatively high probability to taps overlapping with key 622 and a relatively low probability that a user intended to target key 622 when a tap in other locations is detected.

The inventors have recognized and appreciated that a probability distribution function as illustrated in FIG. 6A suitably represents probabilities that a user intended to target key 622 under some conditions. For example, probability distribution function 660$_1$ may be suitable in scenarios in which a user is carefully selecting which key of the soft keyboard to press.

Such a scenario, for example, may occur when a user is typing with one finger or is using a touch typing method, but is typing slowly and carefully.

Under other conditions, a different probability distribution function may be more appropriate. FIG. 6B illustrates a probability distribution function $660_2$ that may be associated with key 622 under other conditions. As with probability distribution function $660_1$, probability distribution function $660_2$ is modeled as a Gaussian distribution with limits imposed by adjacent anchors. However, that distribution has a wider spread, illustrated by $\sigma_{x2}$. Additionally, the mean of the Gaussian distribution is $X_2$, which is offset from the center of key 622 by an amount $\Delta_x$. Probability distribution function $660_2$ may be appropriate for a key at the periphery of the keyboard in a scenario in which a user is typing quickly. The Applicants have recognized and appreciated that in such a scenario, the spread of the probability distribution function increases. In addition, the mean of the probability distribution function is offset towards the center of the keyboard.

More generally, the inventors have recognized and appreciated that an appropriate probability distribution function to associate with a key may depend on multiple factors. Those factors may relate to the user and/or the soft keyboard as rendered on the touchscreen. Accordingly, in some embodiments, to provide a probability that a detected tap on a touchscreen corresponds to a specific key, a probability distribution function for the key may be determined based on runtime conditions, including the style or other configuration parameters of the soft keyboard, and parameters relating to the user, including dynamically determined parameters such as typing speed.

These parameters may be captured in a probability distribution function that is modeled in any suitable way. However, in embodiments in which the probability distribution function is modeled by a finite number of parameters, information about any conditions that may impact the probability distribution functions for the various keys on the soft keyboard may be used to select values of the model parameters. Any suitable mechanism may be used to relate information about context or other factors that may influence the probability distribution functions for the keys to values of model parameters may be used. As an example, the soft keyboard interface component may store one or more tables of values for the parameters that characterize the probability distribution model. In embodiments in which a Gaussian distribution is used as a model of the probability distribution function, those parameters may be the mean and variance of the model.

Those parameters may be organized in any suitable way. In some embodiments, a table may be provided for each key on a keyboard for which a probability distribution function will be determined. Though, in other embodiments, information indicating a specific key on the keyboard may be used as an index to such a table to determine appropriate values for the probability distribution model parameters. As a specific example, a distance of a key from a center of the keyboard may be used as an index to a table from which values of the model parameters may be read.

Values of other parameters may similarly be used in selecting values of parameters for the probability distribution model. Each parameter may be used as an index to a table or a separate table may be provided for each value of a parameter.

As a specific example, an indication of keyboard style, such as whether the keyboard is a full QWERTY keyboard, a simplified keyboard, or a split keyboard, as represented by the embodiments in FIGS. 1 through 3, may be used as a parameter to select values of the parameters of the probability distribution model. In some embodiments, a separate table may be provided for each keyboard style, and a soft keyboard interface component may select the appropriate table from which to read values based on the style of keyboard being rendered. Alternatively or additionally, in some embodiments, a fitted function may be provided for all the parameters, in order to interpolate values at unseen data (speed, keysize, keyboard size, key positions, gutter size etc.) The fitted function may be a polynomial function or any other suitable function Regardless of how values for parameters characterizing a probability distribution model are determined, as a soft keyboard interface component processes keyboard inputs, it may determine the appropriate values for the probability distribution functions associated with each of multiple keys on the keyboard. These values may be used to define probability distribution functions for the keys adjacent to a location at which a user tap is received through the touchscreen. These probability distribution functions may be applied to determine a probability, associated with each of the adjacent keys, that the tap represents user input targeting a specific key. The probability distribution functions for keys may be determined at any suitable time. In embodiments in which the parameters of the operating environment used to determine probability distribution functions for the keys are dictated solely by the configuration of the soft keyboard as rendered, the probability distribution functions may be determined at the time the soft keyboard is rendered.

Figure 7A:
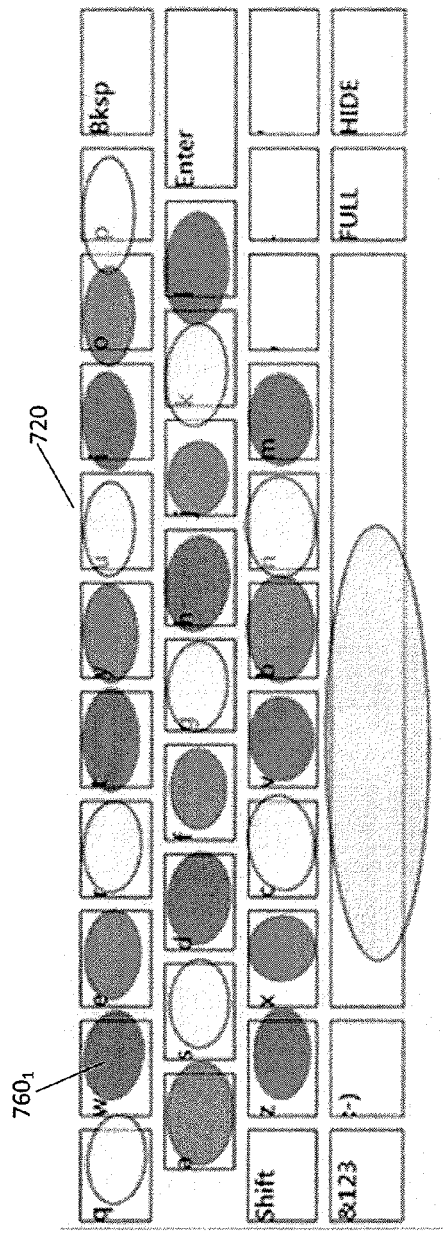
FIG. 7A is a conceptual sketch of probability distribution functions associated with keys on a soft keyboard at a first typing rate.

However, in some embodiments, the parameters used to determine values characterizing the probability distribution functions for the keys may depend on the manner in which the user is interacting with the keyboard. FIG. 7A illustrates a soft keyboard 720. Probability distribution functions associated with each of multiple keys are illustrated. For example, probability distribution function $760_1$ associated with the "w" key is illustrated. In FIG. 7A, though the probability distribution function $760_1$ is multi-dimensional, it is illustrated in two dimensions by showing a contour corresponding to the variance of the probability distribution function.

FIG. 7A illustrates probability distribution function $760_1$ for key "w," and corresponding probability distribution functions for each of the other keys on soft keyboard 720 corresponding to a letter, under an operating condition in which a user of the keyboard is typing slowly. Accordingly, the probability distribution functions are shown generally centered on each of the keys and generally with a spread that is co-extensive with the key. Though, it can be seen that different keys, at different locations on keyboard 720, have probability distribution functions of different shapes.

Figure 7B:
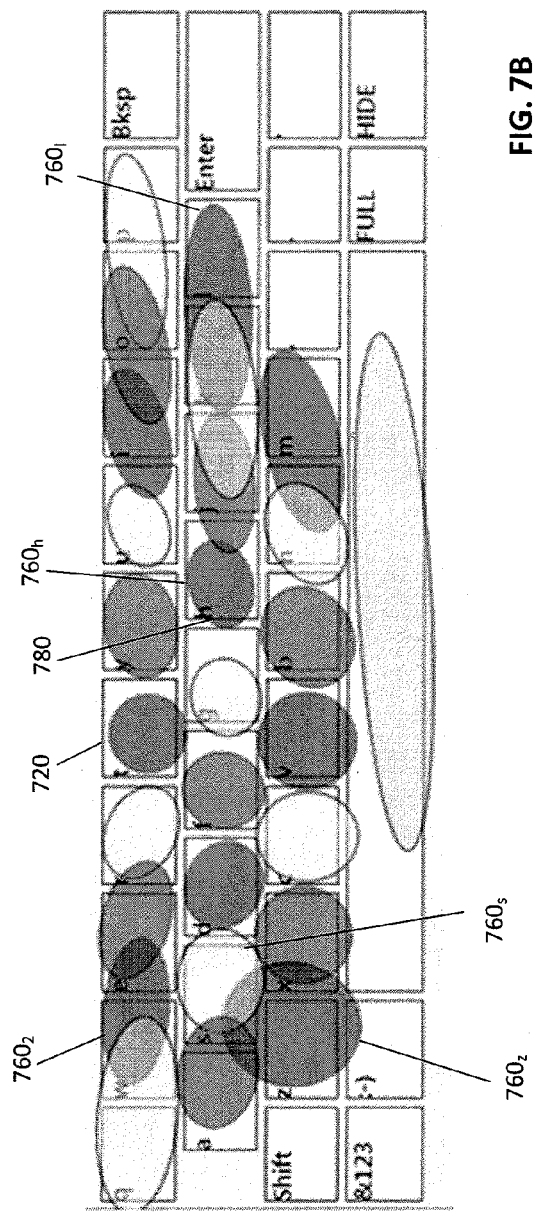
FIG. 7B is a conceptual sketch of probability distribution functions associated with user input on a soft keyboard with the format illustrated in FIG. 7A at a second, faster typing rate.

In contrast, FIG. 7B illustrates those probability distribution functions when a user of keyboard 720 is typing quickly. As can be seen from a comparison of probability distribution function $760_1$ (FIG. 7A) and probability distribution function $760_2$ (FIG. 7B), typing more quickly increases the spread of the probability distribution function and causes an offset of the probability distribution function towards the center 780 of the keyboard. For example, probability distribution function $760_h$, which is close to center 780, has a smaller bias than probability distribution function $760_j$, which is associated with a key further from center 780.

Comparison of probability distribution function $760_s$ and $760_z$ illustrates that the amount of increase in the spread may depend on the location of the key relative to center 780. As can be seen, probability distribution function $760_s$ has a smaller spread than probability distribution function $760_z$. The inventors have recognized and have appreciated that this pattern of variation is appropriate for a full QWERTY keyboard, such as the keyboard styles pictured in FIGS. 1 and 2, though a different pattern of variation may be exhibited by a split keyboard, such as the keyboard illustrated in FIG. 3. Accordingly, values used to model probability distribution functions for the keys on a keyboard may be provided for different keyboard styles and other factors, such as detected typing speed.

Values characterizing the probability distribution functions may be determined in any suitable way. In some embodiments, the values may be determined empirically, heuristically, and/or adaptively. For example, in some embodiments, a designer of an operating system or an application that provides a soft keyboard interface may gather information empirically by providing to multiple potential users sample text to type. By recording the distribution of locations relative to the soft keyboard at which each of the prospective users hit the touchscreen for each intended key required to type the sample, probability distributions could be generated for each of the keys. The probability distribution models may then be fit to these measured distributions to determine which values yield a suitable fit. Such testing may be repeated under each condition or set of conditions for which parameters of the probability distribution model may be desired. Once values of the parameters characterizing the probability distribution model are collected, they may be stored in a table or otherwise made available to the soft keyboard interface component.

As an example of how the probability distribution functions may be defined heuristically, FIGS. 7A and 7B show that the spread of distribution functions increases with typing speed. A spread may be estimated for slow-speed typing to yield a probability distribution function generally co-extensive with each key. This probability distribution function may be used as a baseline and adjusted for conditions that deviate from the baseline conditions using rules or other heuristics. For example, based on a detected typing speed, the appropriate spread for a probability distribution function may be determined by scaling the spread for low-speed typing proportionately to the increase in typing speed. Other factors that impact the probability distribution functions, including other factors as described herein and other suitable factors, may be expressed as rules indicating an approach to adjusting values for parameters characterizing a probability distribution function.

As an example of a manner in which values of parameters may be determined adaptively, information about the accuracy of the predictions may be gathered as the soft keyboard interface component operates. As a specific example, if user input subsequent to displaying text indicates that the user consistently changes a tap input in a particular location from a first key close to that location to a second key, the probability distribution functions of those keys may be adjusted to increase the probability that the soft keyboard interface component will respond to a tap in the same location by assigning a higher probability to the second key.

Regardless of the manner in which values of parameters characterizing the probability distribution functions are determined, those values may be available such that probability distribution functions may be selected based on any desired parameter that may characterize the operating conditions.

Figure 8A:
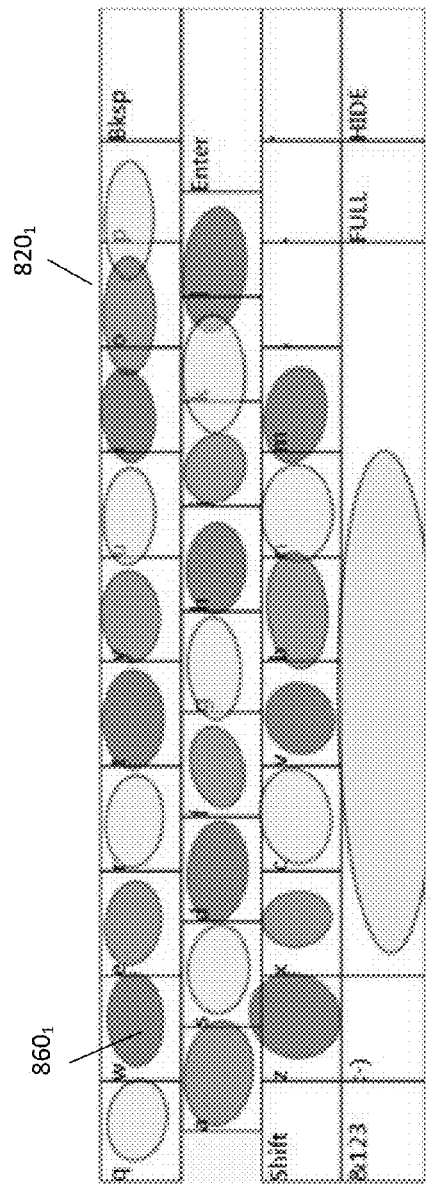
FIG. 8A is a conceptual sketch of probability distribution functions associated with a keyboard having gutters of a first width separating keys.
Figure 8B:
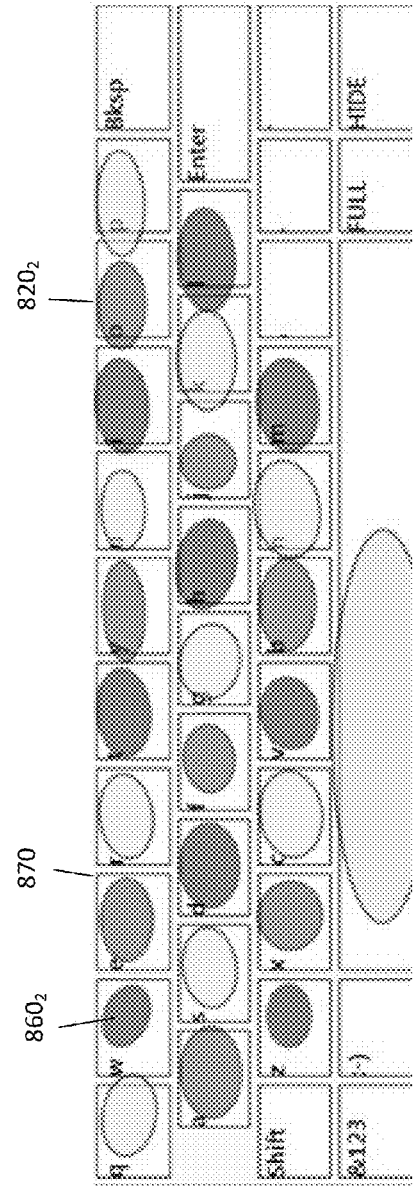
FIG. 8B is a conceptual sketch of probability distributions associated with a keyboard having gutters of a second width separating keys, the second width being greater than the first width illustrated in the embodiment of FIG. 8A.

FIGS. 8A and 8B illustrate that parameters of the keyboard layout may impact the probability distribution function for the keys. FIG. 8A illustrates a soft keyboard $820_1$. Probability distribution functions associated with letter keys are illustrated in FIG. 8A using the same format as in FIG. 7A. In contrast, FIG. 8B illustrates a soft keyboard $820_2$. The soft keyboards $820_1$ and $820_2$ are of the same keyboard style. However, keyboard $820_2$ contains a gutter 870 separating adjacent keys. The inventors have recognized and appreciated that, even for keyboards of comparable size, providing a gutter 870 creating a visual separation between keys may increase the accuracy with which users strike targeted keys.

Accordingly, FIG. 8B illustrates that probability distribution function $860_2$ has a smaller spread than probability distribution function $860_1$. Comparison of other probability distribution functions for corresponding keys in FIGS. 8A and 8B reveal a similar pattern for other keys. As specific examples, parameters of the keyboard layout as rendered may be used in determining the probability distribution functions used to interpret taps. Accordingly, gutter size and/or key size may be parameters of the keyboard layout used in determining appropriate probability distribution functions for the keys. Though, any other parameters may alternatively or additionally be used.

In some embodiments, a soft keyboard interface component may select probability distribution functions for each of multiple keys on a soft keyboard based on values for a combination of parameters. In some embodiments, those parameters may include typing speed, keyboard style, key size, and gutter size. Though, it should be appreciated that the values of any suitable parameters may be used.

Further, FIGS. 8A and 8B illustrate that probability distribution functions are associated with the letter keys and the space bar. A soft keyboard interface component may determine probabilities only for these keys in embodiments in which the probability information is used for processing text. Though, it is not a requirement of the invention that probabilities be reported for all of these keys or only these keys. Embodiments are possible in which probabilities are reported for other keys.

Regardless of the keys for which probabilities are reported in response to a detected tap on a soft key, the soft keyboard interface component may operate to generate probabilities for one or more keys in response to detected inputs. The soft keyboard interface component may, in some embodiments, operate according to the method 900 illustrated in FIG. 9.

Figure 9:
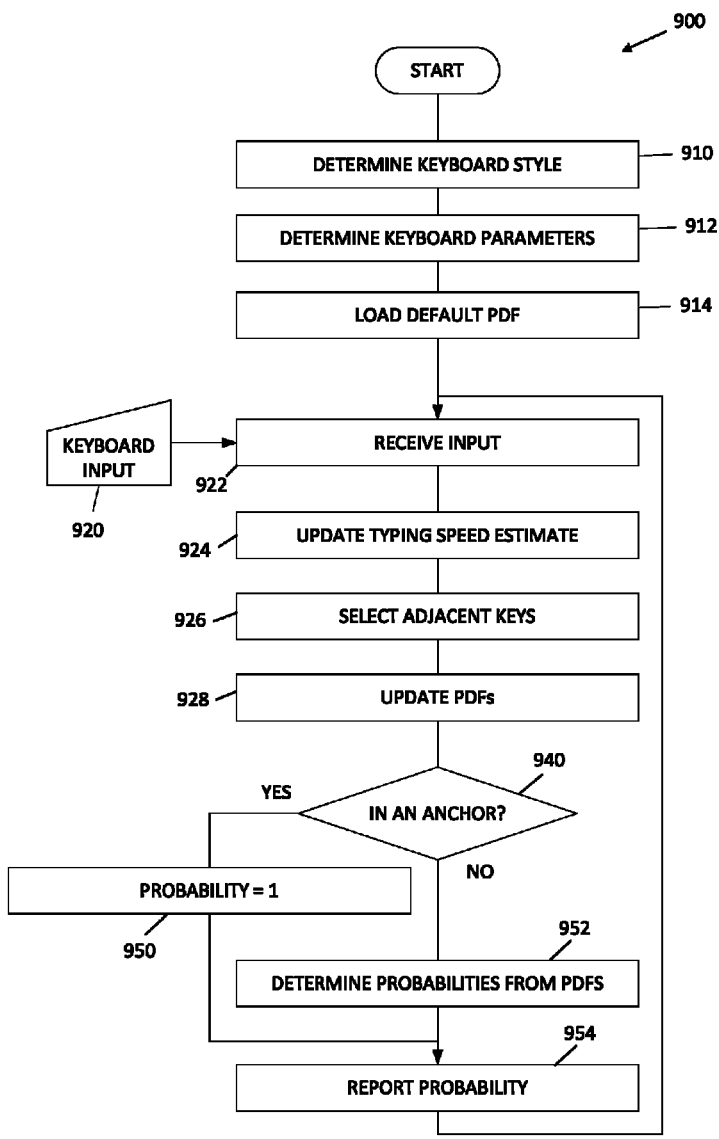
FIG. 9 is a flowchart of a method of operating a keyboard interface component according to some embodiments of the invention.

The method 900 includes multiple acts, some of which may occur upon initial rendering of a soft keyboard. Others of the acts illustrated in FIG. 9 may occur repetitively, as each tap is detected. In the example of FIG. 9, acts 910, 912, and 914 may occur when a soft keyboard is initially rendered or otherwise as part of initialization of the soft keyboard. Moreover, in some embodiments, acts 910, 912, and 914 need not occur as expressly defined steps in the execution of a program implementing a soft keyboard interface component. Rather, the initialization actions implemented by acts 910, 912, and 914 may be coded as part of the soft keyboard interface component.

Regardless of the specific manner in which the component is initialized, method 900 may begin at act 910. At act 910, the keyboard style may be determined. In some embodiments, an application executing on a computing device may indicate a preferred keyboard style. For example, an application that supports informal, chat-type communications may request that a reduced functionality keyboard be rendered. Though, the information on keyboard style may be obtained in any suitable way. In some embodiments, the keyboard style may be specified by direct user inputs, which may be read from a user profile or other source of configuration information.

Regardless of the manner in which the keyboard style is determined, processing may then proceed to act 912. At act 912, the soft keyboard interface component may determine values of keyboard parameters as rendered. For example, these keyboard parameters may be the size of the keys, their positions and/or the size of the gutter between keys. Values for these parameters may be determined in any suitable way. They may depend, for example, on the type of device on which the soft keyboard is being rendered and specifically on factors such as the size of the display or size of the display region allocated to the soft keyboard.

At act 914, a default probability distribution function may be identified for each of the keys for which a probability is to be returned. The probability distribution functions loaded in act 914 may be based on the keyboard style determined in act 910 and the values of other keyboard parameters determined in act 912. Though, the probability distribution functions loaded in act 914 may be selected based on values of any other appropriate parameter that can be determined before the user begins to interact with the keyboard. For example, though not shown in FIG. 9, in some embodiments, a computing device may store profile information for each of multiple potential users of the computing device. Information from the profile of the active user may also be used in act 914 to identify suitable probability distribution functions for keys of the soft keyboard based on historic typing patterns or other historical information collected about the user.

Regardless of the specific parameters used to determine the probability distribution functions, those probability distribution functions may be represented in any suitable way. In some embodiments, the probability distribution functions may be represented by values for parameters of a probability distribution model, such as the mean and variance of a Gaussian probability distribution model as described above. However, any suitable techniques for characterizing the probability distribution functions may be used. Regardless of how represented, the information used to characterize those probability distribution functions may be loaded as part of act 914. Once probability distribution functions are available, the soft keyboard interface component may use those probability distribution functions to process keyboard inputs.

FIG. 9 illustrates a component 920 generating keyboard input. Component 920, for example, may be a controller for a touchscreen. Though, it should be appreciated that component 920 may represent a collection of components, including components that pre-process information generated by a touchscreen controller to identify "taps" prior to providing input to the soft keyboard interface component. Regardless of the source and pre-processing of a keyboard inputs, the soft keyboard interface component may receive those inputs as act 922.

In act 924, the soft keyboard interface component may update a typing speed estimate for the user. In some embodiments, the soft keyboard interface component may track an average rate at which keyboard taps are detected. This average rate may be used as an indication of the speed at which the user is typing, which in turn may be used to dynamically determine probability distribution functions for the keys of the soft keyboard. The typing speed estimate obtained in act 924 may be obtained in any suitable way. Though, as one example, the typing speed estimate may be maintained as a running average of time separating keyboard taps.

Method 900 may then proceed to act 926. At act 926, keys adjacent to the location of the input received at act 922 may be identified. The keys selected at act 926 may be determined in any suitable way. In some embodiments, the keys selected as part of act 926 may include any key including the location of the input received as part of act 922. In addition, any key adjacent to that input location may be included in the selection. Though, any suitable technique for identifying a subset of the keys for which probability values are to be returned may be used. In some embodiments, limits on the probability distribution functions associated with the keys may be used, expressly or implicitly, to select adjacent keys. For example, any key having a probability distribution function that is non-zero at the input location may be selected as part of act 926 or any key which intersects with the touch contact geometry can be used. The inventors have realized that even a combination of such techniques may be used for various application specific corrections and predictions.

Regardless of the manner in which the adjacent keys are selected, at act 928, the probability distribution functions for those selected keys may be updated. In embodiments in which the probability distribution functions depend on the typing speed, the update at act 928 may involve selecting appropriate probability distribution functions for keyboards having characteristics determined in acts 910 and 912 when used as determined in act 924. As with other selections of the probability distribution functions, the selection at act 928 may be made in any suitable way. In some embodiments, the selection may be made by accessing look-up tables associated with each of the selected keys, using as an index into the look-up table values of the parameters determined as part of acts 910, 912, and 924.

Regardless of the manner in which the probability distribution functions are determined, those probability distribution functions may be used to associate a probability with each of the adjacent keys selected as part of act 926. The probability for each key may indicate a probability that the user targeted that key with the input received at act 922.

In embodiments in which the probability distribution functions are subject to limits defined by anchors associated with the keys, method 900 may branch at decision block 940, depending on whether the received input falls within an anchor. If so, method 900 may branch to act 950. At act 950, the soft keyboard interface component may associate a probability of 1 with the key associated with the anchor in which the input falls. Processing may then proceed to act 954 where this probability is reported. In the embodiment illustrated in FIG. 9, when a keyboard input falls within the anchor of a key, probabilities for other keys are not reported. Though, in other embodiments, an input falling within the anchor of a key may be reported in any suitable way. As an example of an alternative that may be used in some embodiments, an input detected within the anchor of a key may be reported separately from probabilities associated with other adjacent keys such that a post-processing component receiving output from the soft keyboard interface component may be programmed to make use of information about inputs within an anchor in any suitable way.

Regardless of the manner in which inputs within an anchor are specified, if the input received as part of act 922 does not fall within an anchor, method 900 may proceed to act 952. At act 952, probabilities may be determined for each of the adjacent keys selected as part of act 926. Determining the probabilities at block 952 may entail selecting a value from the updated probability distribution functions for those adjacent keys based on the location of the received input relative to a reference point on each of those keys. In the embodiments described in connection with FIGS. 6A and 6B, the reference point of each key is taken to be its center. Though, in other embodiments, such as for a split keyboard, the reference point may be an edge of the keyboard or other suitable location. Though, any suitable mechanism may be used to determine a probability for an input at a particular location based on the spatial probability distribution functions associated with the keys.

Regardless of the manner in which the probabilities are determined for each of the adjacent keys, processing may proceed to act 954. At act 954, the determined probability or probabilities may be reported. These reports may be made to a post-processing component, such as a text-prediction engine. Though, regardless of any post-processing, information indicating the key or keys associated with the received input may be provided to an application or other component receiving input from the soft keyboard. This input may be provided using techniques as are known in the art or in any other suitable way.

Figure 10:
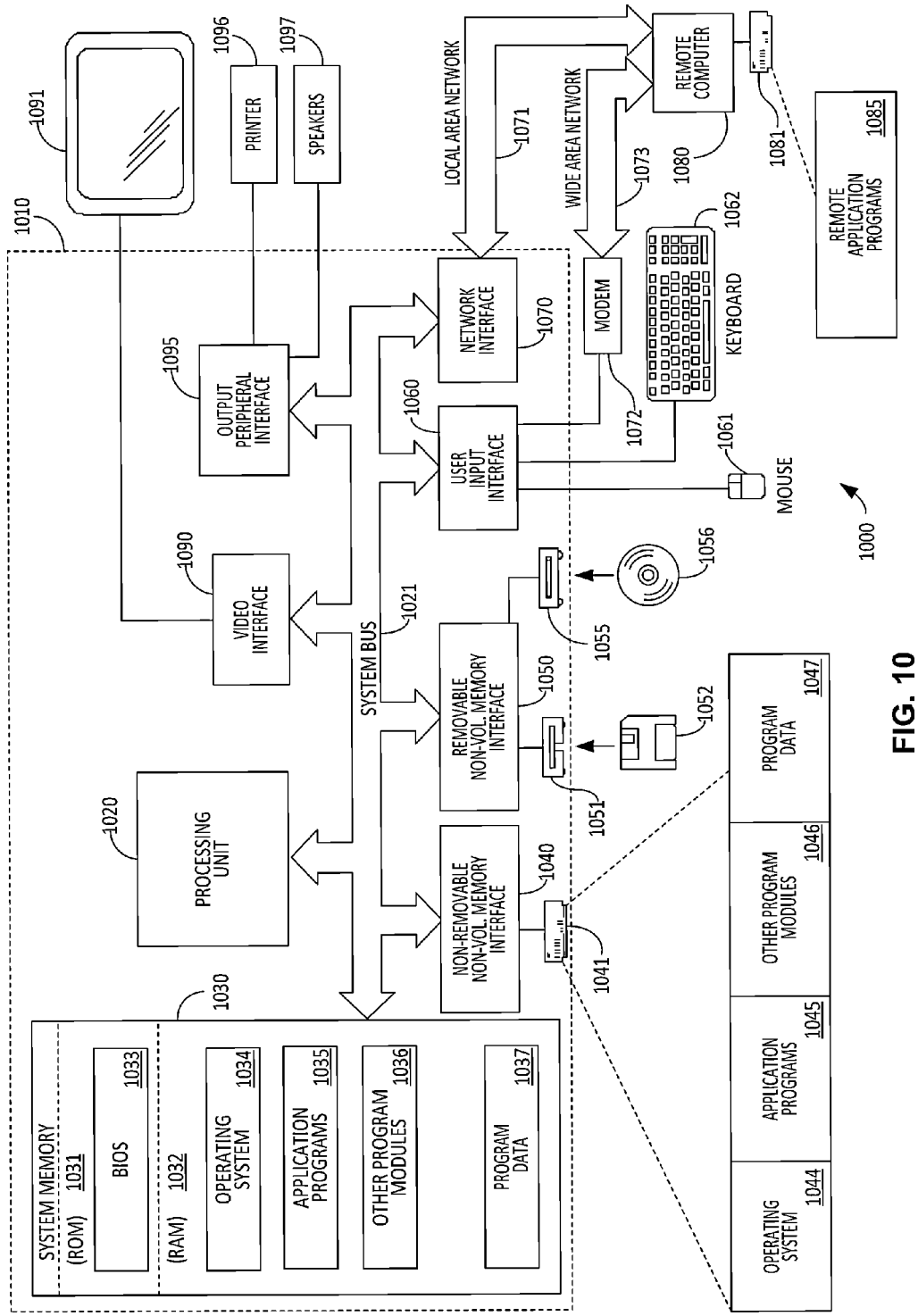
FIG. 10 is a conceptual block diagram of a computing device in which embodiments of the invention may be practiced.

Soft keyboard interface techniques as described herein may be integrated in any suitable computing device. FIG. 10 illustrates an example of a suitable computing system environment 1000 on which the invention may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing the invention includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through an non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 1062 and pointing device 1061, commonly referred to as a mouse, trackball or touch pad. Though, in embodiments in which a touchscreen is used as an input and output device, there may be no separate human interface devices of this type. Other input devices (not shown), which may be present instead of or in addition to these components, may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. This display device may be a touchscreen, as described above, and it may be integrated into a body of the computing device. In addition to the monitor, computers may also include other peripheral output devices such as speakers 1097 and printer 1096, which may be connected through a output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, user activation of a keyboard was described as being performed through a "tap." User input may also be detected based on a drag of a finger across a keyboard. Accordingly, it should be appreciated that any suitable gesture signifying user activation may be recognized and interpreted as user input.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing device having a soft keyboard, the method comprising:
   determining at least one characteristic of at least one of: (i) an average time between taps or (ii) a style of the soft keyboard;
   determining, for each of a plurality of keys on the soft keyboard, a mean of a probability distribution function and an indication of a spread of the probability distribution function, the mean and the indication of the spread being determined based on the at least one determined characteristic;
   with a soft keyboard interface executing on at least one processing circuit:
      in response to a first input received through the soft keyboard:
         generating a first set of probabilities based on the probability distribution functions, wherein the first set of probabilities includes:
            a first indication indicative of a probability that a first key was targeted for the first input; and
            a second indication indicative of a probability that a second key was targeted for the first input;
         providing the first set of probabilities to a text prediction engine executing on the at least one processing circuit; and
      in response to a second input received through the soft keyboard:
         generating a second set of probabilities based on the probability distribution functions, wherein the second set of probabilities includes:
            a third indication indicative of a probability that a third key was targeted for the second input; and
            a fourth indication indicative of a probability that a fourth key was targeted for the second input;
         providing the second set of probabilities to the text prediction engine executing on the at least one processing circuit; and
   with the text prediction engine, predicting an intended word based on:
      the first indication indicative of the probability that the first key was targeted for the first input;
      the second indication indicative of the probability that the second key was targeted for the first input;
      the third indication indicative of the probability that the third key was targeted for the second input; and
      the fourth indication indicative of the probability that the fourth key was targeted for the second input.

2. The method of claim 1, wherein:
   the mean and the indication of the spread of the probability distribution function are also based on the average time between taps.

3. The method of claim 1, wherein:
   the mean and the indication of the spread of the probability distribution function are also based on the style of the soft keyboard.

4. The method of claim 1, wherein:
   the mean and the indication of the spread of the probability distribution function are also based on a position of the key relative to a reference location on the soft keyboard.

5. The method of claim 4, wherein:
   the mean and the indication of the spread of the probability distribution function are also based on the size of the key.

6. The method of claim 5, wherein:
the probability distribution function for each of the plurality of keys is a two dimensional spatial probability distribution function with the mean measured relative to a center of the key; and
at least one parameter of the probability distribution function is obtained by function fitting.

7. At least one computer-readable storage medium comprising computer-executable instructions that, when executed, perform a method of operating a soft keyboard interface on a computing device that processes input from a soft keyboard and a text prediction engine on the computing device, the method comprising:
receiving, by the soft keyboard interface, an indication of a first activation of a first location of a soft keyboard;
providing, by the soft keyboard interface, a first probability based at least in part on a mean of a first probability distribution function and on an indication of a spread of the first probability distribution function to the text prediction engine, wherein the first probability represents a likelihood that a first key of the soft keyboard was targeted for the first activation, and wherein the mean of the first probability distribution function and the indication of the spread of the first probability distribution function are based at least in part on a typing speed of input received via the soft keyboard or a style of the soft keyboard;
providing, by the soft keyboard interface, a second probability based at least in part on a mean of a second probability distribution function and on an indication of a spread of the second probability distribution function to the text prediction engine, wherein the second probability represents a likelihood that a second key of the soft keyboard was targeted for the first activation, and wherein the mean of the second probability distribution function and the indication of the spread of the second probability distribution function are based at least in part on the typing speed of input received via the soft keyboard or the style of the soft keyboard;
receiving, by the soft keyboard interface, an indication of a second activation of a second location of the soft keyboard;
providing, by the soft keyboard interface, a third probability and a fourth probability to the text prediction engine, wherein the third probability represents a likelihood that a third key of the soft keyboard was targeted for the second activation, and wherein the fourth probability represents a likelihood that a fourth key of the soft keyboard was targeted for the second activation;
receiving, by the text prediction engine, the first, second, third, and fourth probabilities from the soft keyboard interface; and
predicting, by the text prediction engine, a word according to the first, second, third, and fourth probabilities received from the soft keyboard interface.

8. The at least one computer-readable storage medium of claim 7, wherein the method further comprises:
receiving, by the soft keyboard interface, an indication of a third activation of a third location of the soft keyboard;
determining, by the soft keyboard interface, that a location of the third activation is within a central region of a fifth key of the soft keyboard; and
providing, by the soft keyboard interface, an indication that the fifth key was activated.

9. The at least one computer-readable storage medium of claim 7, wherein:
the computer readable storage medium further stores instructions for computing the first and second probability distribution functions; and
the method further comprises:
computing the first and second probability distribution functions using the stored instructions for computing the first and second probability distribution functions and an indication of the layout of the soft keyboard on a display of the computing device.

10. The at least one computer-readable storage medium of claim 9, wherein:
the typing speed of input received via the soft keyboard is based on a measured average time between user activations of the keyboard.

11. The at least one computer-readable storage medium of claim 10, wherein:
the instructions for computing the first and second probability distribution function comprise instructions that increase the indication of the spread of the first probability distribution function in response to an increase in the typing speed of the input received via the soft keyboard.

12. The at least one computer-readable storage medium of claim 10, wherein:
the plurality of keyboard layouts comprise:
a QWERTY keyboard;
a reduced QWERTY keyboard; and
a split keyboard.

13. The at least one computer-readable storage medium of claim 12, wherein:
the instructions for computing the first and second probability distribution functions comprise instructions that determine an offset for each of the first and second probability distribution functions, the offset being:
increased based on the increase in the typing speed of the input received via the soft keyboard; and
decreased in a direction towards a central portion of the soft keyboard for a QWERTY and a reduced QWERTY keyboard; and/or
increased in a direction away from an edge of the soft keyboard for a split keyboard.

14. A computing device comprising:
a display adapted to visually present a soft keyboard;
a touchscreen controller configured to provide indications of activations of the soft keyboard;
a keyboard interface configured to monitor a typing rate associated with the soft keyboard; and
a processor configured to, for each of multiple activations in the region, provide probabilities for each of a set of keys proximate the location of that activation based at least in part on respective means of probability distribution functions for each of the set of keys proximate the location of that activation and on respective indications of spreads of the probability distribution functions, the individual probabilities representing likelihoods that an associated key was targeted for that particular activation, and the probability distribution functions being based at least in part on at least one of the typing rate or a style of the soft keyboard; and
the processor further configured to predict a word based on:
a first likelihood that a first key was targeted for a first activation of the multiple activations;
a second likelihood that a second key was targeted for the first activation of the multiple activations;
a third likelihood that a third key was targeted for a second activation of the multiple activations; and
a fourth likelihood that a fourth key was targeted for the second activation of the multiple activations.

15. The computing device of claim 14, wherein:
the individual probabilities are based on a layout of the soft keyboard.

16. The computing device of claim 14, wherein:
the processor is further configured to:
   compute, for each of the set of keys, the probability distribution function to represent a probability that a given activation at a location proximate that key represents intent to actuate that key; and
   determine the provided probabilities based on the probability distribution functions.

17. The computing device of claim 16, wherein:
the processor is further configured to:
   compute the probability distribution functions via selection of parameters of a Gaussian distribution based on the typing rate.

18. The computing device of claim 14, wherein:
the individual probabilities are further based on a size of a gutter between adjacent keys on the soft keyboard.

19. The computing device of claim 14, wherein:
the computing device has a tablet form factor.

\* \* \* \* \*